United States Patent [19]

Sanada et al.

[11] Patent Number: 5,269,825
[45] Date of Patent: Dec. 14, 1993

[54] METHOD OF MANUFACTURING RADIATION-RESISTANT OPTICAL FIBER

[75] Inventors: Kazuo Sanada, Chiba; Tsunemi Kakuta, Mito, both of Japan

[73] Assignees: Fujikura, Ltd.; Japan Atomic Energy Research Institute, both of Tokyo, Japan

[21] Appl. No.: 938,549

[22] Filed: Aug. 28, 1992

Related U.S. Application Data

[60] Division of Ser. No. 806,844, Dec. 9, 1991, abandoned, which is a continuation of Ser. No. 507,034, Apr. 9, 1990, abandoned.

[30] Foreign Application Priority Data

Apr. 28, 1989 [JP] Japan ................................. 1-110799

[51] Int. Cl.$^5$ .......................................... C03B 37/075
[52] U.S. Cl. ..................... 65/3.11; 65/3.12; 65/32.4; 65/900
[58] Field of Search ..................... 65/2, 3.11, 3.12, 3.4, 65/30.1, 324, 60.6, 60.8, 900

[56] References Cited

U.S. PATENT DOCUMENTS

| | | | |
|---|---|---|---|
| 3,540,870 | 11/1970 | Li | 65/32.4 |
| 3,788,827 | 1/1974 | De Luca | 65/32.1 |
| 4,157,253 | 6/1979 | Hernqvist | 65/30.1 |
| 4,179,596 | 12/1979 | Bjork | 65/900 |
| 4,473,599 | 9/1984 | Elion | 65/3.11 |
| 4,592,932 | 6/1986 | Biswas | 65/3.11 |
| 4,600,422 | 7/1986 | Scott | 65/32.4 X |
| 4,685,945 | 8/1987 | Freund | 65/30.1 |
| 4,702,759 | 10/1987 | Roba | 65/32.1 |
| 4,863,760 | 9/1989 | Schnatz | 65/60.6 |
| 4,911,742 | 3/1990 | Newbould | 65/900 |

FOREIGN PATENT DOCUMENTS

| | | | |
|---|---|---|---|
| 755899 | 3/1971 | France | 65/3.44 |
| 134221 | 2/1979 | German Democratic Rep. | |
| 60-90852 | 5/1985 | Japan | 65/900 |
| 2149392 | 6/1985 | United Kingdom | 65/900 |

OTHER PUBLICATIONS

JPOABS; Abstracts of Japan Patents 62-100703 (May, 1987), 61-208014 (Sep. 1986), 61-178443 (Aug. 1986), 60-50502 (Mar. 1985).

Radiation Effects in Pure Silica Core and Ge-doped Silica Core Fibers, Tsunemi Kakuta, et al, pp. 128-145, Fujikura Technical Review, 1985.

Radiation Effects of Optical Silica Fiber and Radiation Hard Optical Transmission, T, Suematsu, et al, pp. 119-127, International Wire & Cable Symposium Proceedings 1982.

Radiation Resistance Characteristics of Optical Fibers, T. Kakuta, et al, pp. 1139-1143, Journal of Lightwave Technology, vol. LT-4, No. 8, Aug., 1986.

Primary Examiner—Robert L. Lindsay
Attorney, Agent, or Firm—Frishauf, Holtz, Goodman & Woodward

[57] ABSTRACT

A method of manufacturing a radiation-resistant optical fiber includes steps of a) heating a bare optical fiber to remove residual hydrogen gas present in the bare optical fiber and b) forming a coating layer consisting of a substance which does not allow permeation of hydrogen gas on the surface of the bare optical fiber from which the residual hydrogen gas has been removed.

4 Claims, 2 Drawing Sheets

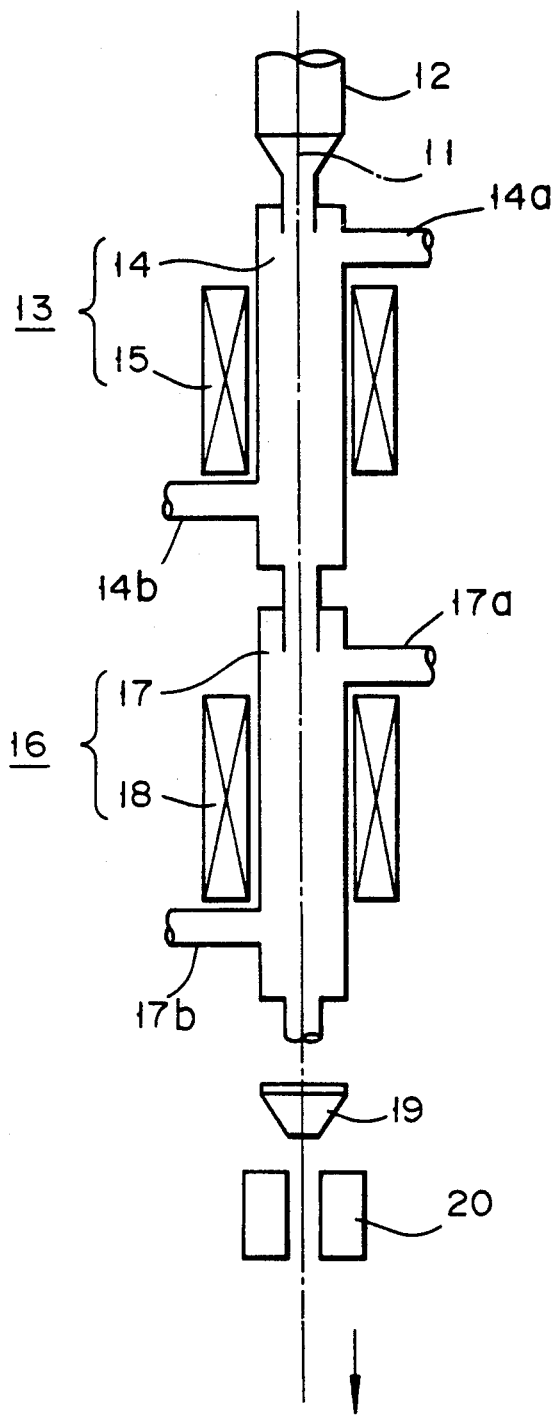
F I G. 2

METHOD OF MANUFACTURING RADIATION-RESISTANT OPTICAL FIBER

This application is a division of application Ser. No. 07/806,844, filed Dec. 9, 1991, which in turn is a continuation application of Ser. No. 07/507,034 filed Apr. 9, 1990 (both now abandoned).

BACKGROUND OF THE INVENTION

1. Field of the Invention

The present invention relates to a method of manufacturing a radiation-resistant optical fiber and, more particularly, to a method of manufacturing an optical fiber with a high radiation resistance which can be used as, e.g., an optical fiber cable in nuclear associated plants or nuclear reprocessing plants in which exposure to a high radiation dose is expected.

2. Description of the Related Art

A radiation-resistant optical fiber must be used as an optical cable for use in environments in which a radiation dose is high. An optical fiber having a pure silica core has been conventionally used as such a radiation-resistant optical fiber.

FIG. 1 is a sectional view showing the structure of an optical fiber having a pure silica core. Referring to FIG. 1, reference numeral 1 denotes a core consisting of pure silica; and 2, a cladding. A bare optical fiber is constituted by the core 1 and the cladding 2. The bare fiber is double-covered with a primary coating layer 3 consisting of a modified silicone resin and a secondary buffer coating layer 4 consisting of a plastic material such as nylon.

The optical fiber having a pure silica core has a higher radiation resistance than that of a normal optical fiber having a $GeO_2$-doped core.

Although the conventional pure silica core optical fiber has a high radiation resistance as described above, the following characteristic degradation occurs if an exposed radiation dose becomes $10^6$ R or more. That is, $SiO_2$ in the optical fiber is destroyed by radiation to cause NBOHC (Non Bridging Oxygen Hole Center; Si—O·), and hydrogen gas reacts with this NBOHC (Si—O·) to produce an OH group. When the OH group in the fiber is increased in number, optical communication using a wavelength band of 1.3 $\mu$m becomes impossible due to increase of optical absorption loss caused by the OH group.

Note that possible supply sources of the hydrogen gas which reacts with the NBOHC (Si—O·) to produce the OH group are hydrogen gas occluded in the optical fiber, or hydrogen gas generated when the primary and secondary buffer coating layers are decomposed by radiation.

SUMMARY OF THE INVENTION

It is an object of the present invention to provide a method of manufacturing an optical fiber which can prevent generation of OH groups even in a high radiation exposure environment in which a radiation dose is $10^6$ R or more and which does not interfere with optical communication using a wavelength band of 1.3 $\mu$m.

In order to achieve the above object of the present invention, there is provided a method of manufacturing an optical fiber comprising the steps of: heating and removing residual hydrogen gas in a bare optical fiber; and forming a coating layer consisting of a material which does not allow permeation of hydrogen gas on the surface of the bare optical fiber from which the residual gas is removed.

In the present invention, the material of the coating layer is not particularly limited as long as it inhibits permeation of hydrogen gas. Examples of the material are carbon and silicon carbide.

In an optical fiber manufactured by the present invention, residual hydrogen gas is removed from a bare optical fiber, and the bare optical fiber is covered with a layer which does not allow permeation of hydrogen gas. Therefore, even if NBOHC (Si—O·) is produced in the optical fiber due to exposure to a high radiation dose at $10^6$ R or more, generation of an OH group in the optical fiber can be prevented since no hydrogen gas to be bonded to this defect is supplied. Therefore, even in an environment susceptible to exposure to a high radiation does, no absorption loss occurs due to an OH group and optical communication using a wavelength band of 1.3 $\mu$m can be stably performed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawing, which is incorporated in and constitutes a part of the specification, illustrates presently preferred embodiments of the invention and, together with the general description given above and the detailed description of the preferred embodiments given below, serves to explain the principles of the invention.

FIG. 2 is a schematic view showing an optical fiber manufacturing apparatus used to practice a method of manufacturing a radiation-resistant optical fiber according to the present invention.

DETAILED DESCRIPTION OF THE PREFERRED EMBODIMENT

Figure 1:
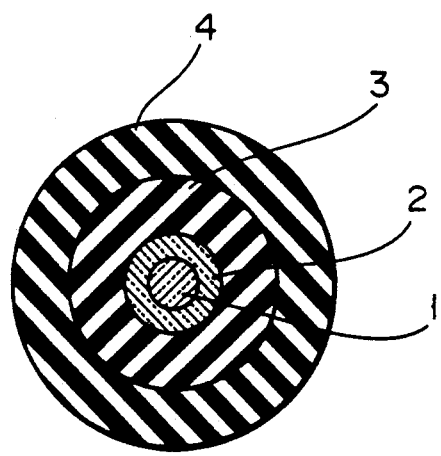
FIG. 1 is a schematic sectional view showing a conventional radiation-resistant optical fiber.

A preferred embodiment of a method of manufacturing a radiation-resistant optical fiber according to the present invention will be described in detail below with reference to the accompanying drawing.

FIG. 2 shows a manufacturing apparatus for use in the method of manufacturing a radiation-resistant optical fiber according to the present invention. Referring to FIG. 2, reference numeral 11 denotes a bare optical fiber. This bare optical fiber is obtained by drawing an optical fiber mother rod (not shown) in a drawing furnace 12. The drawn bare optical fiber 11 is supplied to a heating/pressurizing furnace 13 airtightly provided downstream the drawing furnace 12. The heating/pressurizing furnace 13 heats and removes residual hydrogen in the bare optical fiber 11 drawn by the furnace 12 in an inert atmosphere and pressurizes the inert atmosphere to substitute the residual hydrogen with a gas of the inert atmosphere. In order to achieve these functions, the furnace 13 includes a heating/pressurizing tube 14 for heating/pressurizing the bare optical fiber 11 and a heat generating member 15 for heating the tube 14, and is connected to an inert gas supply tube 14a for supplying an inert gas into the tube 14 and an inert gas exhaust tube 14b for exhausting the inert gas. A CVD (Chemical Vapor Deposition) furnace 16 is air-tightly provided downstream of the furnace 13. The CVD furnace 16 forms a carbon film, by using a CVD method, on the surface of the bare optical fiber 11 from which the residual hydrogen gas has been removed and substituted with the inert gas in the heating/pressurizing furnace 13. The furnace 16 is constituted by a CVD reaction tube 17 for accelerating a CVD reaction therein to form a carbon film on the surface of the bare optical fiber 11 and a heat generating member 18 for heating the tube 17. A source compound supply tube 17a for supplying a source compound to the reaction tube 17 is connected to an upper portion of the tube 17, and an exhaust tube 17b for exhausting a non-reacted gas from the tube 17 is connected to a lower portion of the tube 17. A resin solution coating unit 19 and a heat curing unit 20 are continuously provided downstream the CVD furnace 16 to form a protective coating layer on the carbon film formed in the furnace 16.

A method of manufacturing a radiation-resistant optical fiber according to the present invention using the apparatus having the above arrangement will be described below.

The bare optical fiber 11 drawn from a mother rod in the drawing furnace 12 is continuously supplied to the heating/pressurizing furnace 13, the CVD furnace 16, the resin coating unit 19 and the heat curing unit 20 which are sequentially provided downstream of the drawing furnace 12. In this case, the bare optical fiber 11 is supplied at a predetermined rate along the central axes of these furnaces and units. In the heating/pressurizing furnace 13, an inert gas is supplied from the inert gas supply tube 14a, and the heat generating member 15 is activated to generate heat. A heating temperature is preferably 500° C. to 1,200° C. By adjusting a supply rate of the inert gas and its exhaust amount from the inert gas exhaust tube 14b, the pressure of the inert gas in the heating/pressurizing tube 14 is kept high. Residual hydrogen gas in the bare optical fiber 11 is easily removed and substituted by the inert gas by this heating/pressurizing treatment. A preferable example of the inert gas to be supplied is absolutely dry high-impurity helium gas. The bare optical fiber 11 from which residual hydrogen is removed as described above is air-tightly introduced into the downstream CVD furnace 16 to form a carbon film on its surface. That is, a source compound for forming the carbon film is supplied from the source compound supply tube 17a to the CVD reaction tube 17, and the tube 17 is heated by the heat generating member 18. The source compound supplied from the tube 17a is not particularly limited as long as it is a compound which is thermally decomposed to form a carbon film. Preferable examples of the source compound, however, are hydrocarbon having 15 or less carbon atoms and halogenated hydrocarbon in consideration of the properties of a formed carbon film and a formation speed. Such a source compound is supplied in the form of a gas. Alternatively, the source compound can be diluted and supplied by the same inert gas as that supplied to the inert gas supply tube 14a. Although a supply rate is arbitrarily selected in accordance with the type of source compound and the heating temperature, it is normally, preferably 0.2 to 1.0 l/min. The heating temperature of the heat generating member 18 is arbitrarily selected in accordance with the type of supply compound and is normally about 400° C. to 1,200° C. In this manner, in the CVD furnace 16, the source compound is thermally decomposed to form the carbon film having hydrogen permeation inhibiting power on the surface of the bare optical fiber 11. The bare optical fiber 11 having the carbon film formed on its surface is introduced to the downstream resin coating unit 19 and then to the heat curing unit 20. In the resin coating unit 19, a thermosetting resin or the like for forming a protective coating layer is coated on the surface of the bare optical fiber 11. The coated resin is set by a heat treatment performed in the heat curing unit 20.

In the above embodiment, in order to remove residual hydrogen gas in a bare optical fiber, the residual hydrogen gas is substituted by a high-temperature highpressure inert gas. In the present invention, however, hydrogen can be removed by simply heating an optical fiber.

In the above embodiment, carbon is used as a substance having the hydrogen permeation inhibiting power. The substance, however, is not limited to carbon but may be, e.g., silicon carbide.

EXAMPLE 1

A radiation-resistant optical fiber according to the present invention was manufactured by using the manufacturing apparatus as shown in FIG. 2. Note that a graphite furnace was used as the heating/pressurizing furnace 13. A quartz tube was used as the reaction tube 17 of the CVD furnace and heated by an electric furnace (kanthal wires). A die spot was used as the resin coating unit 19, and a thermosetting resin solution was filled in the die spot. In the heat curing unit 20, kanthal wires were used to heat the resin.

A mother rod (outer diameter = 20 mm) having a core portion consisting of pure silica was placed in the drawing furnace 12. This mother rod was heated up to 2,200° C. to draw the bare optical fiber 11 having an outer diameter of 125 μm at a drawing rate of 60 m/min. At the same time, the heating/pressurizing furnace 13 was heated up to 500° C. to 1000° C., and high-purity helium gas having a dew point of −90° C. or less was supplied from the inert gas supply tube 14a to maintain a pressure of $1.5 \times 10^5$ Pa in the heating/pressurizing tube. A tetraalkylsilane vapor as a source gas was supplied at a supply rate of 0.2 l/min into the CVD furnace 16 heated up to 400° C. The bare optical fiber 11 was run through the heating/pressurizing furnace 13 and the CVD furnace 16. As a result, residual hydrogen gas in the bare optical fiber 11 was removed and substituted by helium gas, and a carbon film was coated on the surface of the bare optical fiber 11. This optical fiber was inserted in the die spot 19 containing a silicone resin solution to coat the silicone resin solution on the carbon film. The resultant optical fiber was introduced into the heat curing unit 20 and heated up to 300° C. by the electric furnace (kanthal wires) to set the silicone resin, thereby forming a protective coating layer. As a result, an optical fiber having an outer diameter of 400 μm was obtained.

When the optical fiber obtained as described above was used to perform optical communication using a wavelength band of 1.3 μm, no absorption loss caused by an OH group occurred even under radiation of $10^6$ R, and communication could be stably performed.

Even when a radiation dose was increased up to $10^8$ R, optical communication could be stably performed by using a wavelength band of 1.3 μm. That is, it was confirmed that the optical fiber manufactured by the method of the present invention had a high radiation resistance.

EXAMPLE 2

A spun bare optical fiber 11 was baked in vacuum without using the heating/pressurizing furnace 13. An optical fiber was manufactured following the same procedures as in Example 1 from the step using the CVD furnace 16. Baking was performed at a temperature of 500° C. to 1000° C. and a vacuum degree of $1\times10^4$ Pa for five minutes. When this optical fiber was used to perform optical communication using a wavelength band of 1.3 μm under radiation of $10^6$ R, no light absorption caused by an OH group occurred, and optical communication could be stably performed. That is, it was confirmed that the optical fiber obtained in Example 2 had a high radiation resistance.

Additional advantages and modifications will readily occur to those skilled in the art. Therefore, the invention in its broader aspects is not limited to the specific details, and illustrated examples shown and described herein. Accordingly, various modifications may be made without departing from the spirit or scope of the general inventive concept as defined by the appended claims and their equivalents.

What is claimed is:

1. A method of manufacturing a radiation-resistant optical fiber which is capable of withstanding an exposure to radiation levels of $10^6$ Roentgen and higher, for use in areas where high levels of radiation exist, the combination of steps comprising:

a) providing an optical fiber having a pure silica core, and a cladding including silica which has a refractive index less than that of the silica core, said optical fiber including an amount of hydrogen which will deteriorate the radiation resistance of the fiber;

b) heating the optical fiber in a chamber having an inlet and an outlet, said inlet being connected to a source of helium for supplying helium to said chamber, said helium being removed from said chamber through said outlet to create a helium gas flow, said optical fiber being heated to a temperature at which said hydrogen is released from said optical fiber so as to form a hydrogen purged optical fiber;

c) maintaining a pressurized helium gas atmosphere in said chamber by adjusting the inlet and outlet, so that helium in said pressurized helium gas atmosphere will substitute for said hydrogen as said hydrogen is released from the optical fiber during said heating, to thereby provide a hydrogen purged helium-substituted optical fiber;

d) the released hydrogen being entrained in said helium gas flow and thereby being removed from said chamber;

e) coating said hydrogen purged helium-substituted optical fiber with one of an elemental carbon film and a silicon carbide film which does not allow permeation of hydrogen gas through the film to thereby prevent subsequent hydrogen contamination of said hydrogen purged helium-substituted optical fiber, said hydrogen purged optical fiber being provided with said coating immediately after said heating step without said fiber being exposed to an atmosphere other than helium.

2. The method of claim 1, wherein said heating step comprises heating said optical fiber at an atmosphere temperature of 500° C. to 1,200° C.

3. The method of claim 1, wherein a chemical vapor deposition process is used to coat the hydrogen purged helium-substituted optical fiber.

4. The method of claim 1, further comprising forming a resin coating layer over said film.

* * * * *